Figure 1:
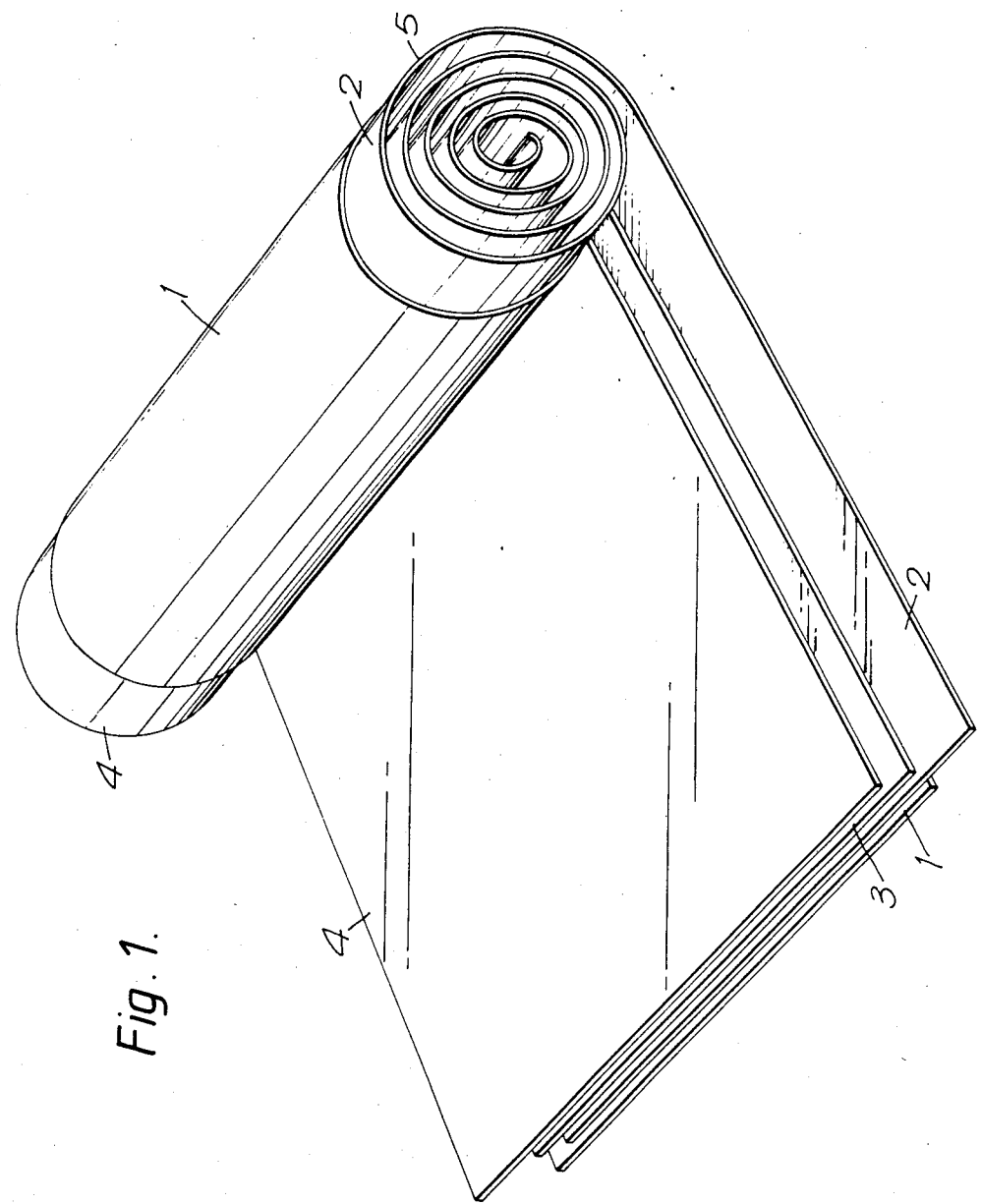

United States Patent [19]

Adams et al.

[11] Patent Number: 4,545,108
[45] Date of Patent: Oct. 8, 1985

[54] COLD-WELDING OF ELECTROLYTIC CAPACITOR ROLLS

[75] Inventors: Graham L. Adams, London, England; Peter F. Briscoe, Trenton, Canada; Arthur F. Dyson, Gorleston-on-sea, England

[73] Assignee: Standard Telephones and Cables, Public Limited Company, London, England

[21] Appl. No.: 558,899

[22] Filed: Dec. 7, 1983

[30] Foreign Application Priority Data

Dec. 7, 1982 [GB] United Kingdom ............... 8234870
Dec. 7, 1982 [GB] United Kingdom ............... 8234871

[51] Int. Cl.[4] .................... H01G 9/24; H01G 9/04
[52] U.S. Cl. ............................ 29/570; 228/115; 361/433
[58] Field of Search ................ 29/570; 228/115, 116; 361/433

[56] References Cited

U.S. PATENT DOCUMENTS

| | | | |
|---|---|---|---|
| 3,854,196 | 12/1974 | Derrick et al. | 29/570 |
| 4,231,076 | 10/1980 | Markarian et al. | 29/570 X |
| 4,267,566 | 5/1981 | Moresi, Jr. | 29/570 X |
| 4,323,950 | 4/1982 | Bernard | 29/570 X |

Primary Examiner—Brian E. Hearn
Assistant Examiner—Alan E. Schiavelli
Attorney, Agent, or Firm—Dennis P. Clarke

[57] ABSTRACT

All the layers of the anode foil of an electrolytic capacitor roll (5) are cold welded to a piece of tabbing (8) using radiussed weld tooling (10, 12, 13) which bends the foil layers in the course of the welding operation so as to enable a good weld to be effected. The cathode foil layers are welded to their piece of tabbing in the same way. Optionally the roll may be partially flattened at the time the welds are made.

4 Claims, 9 Drawing Figures

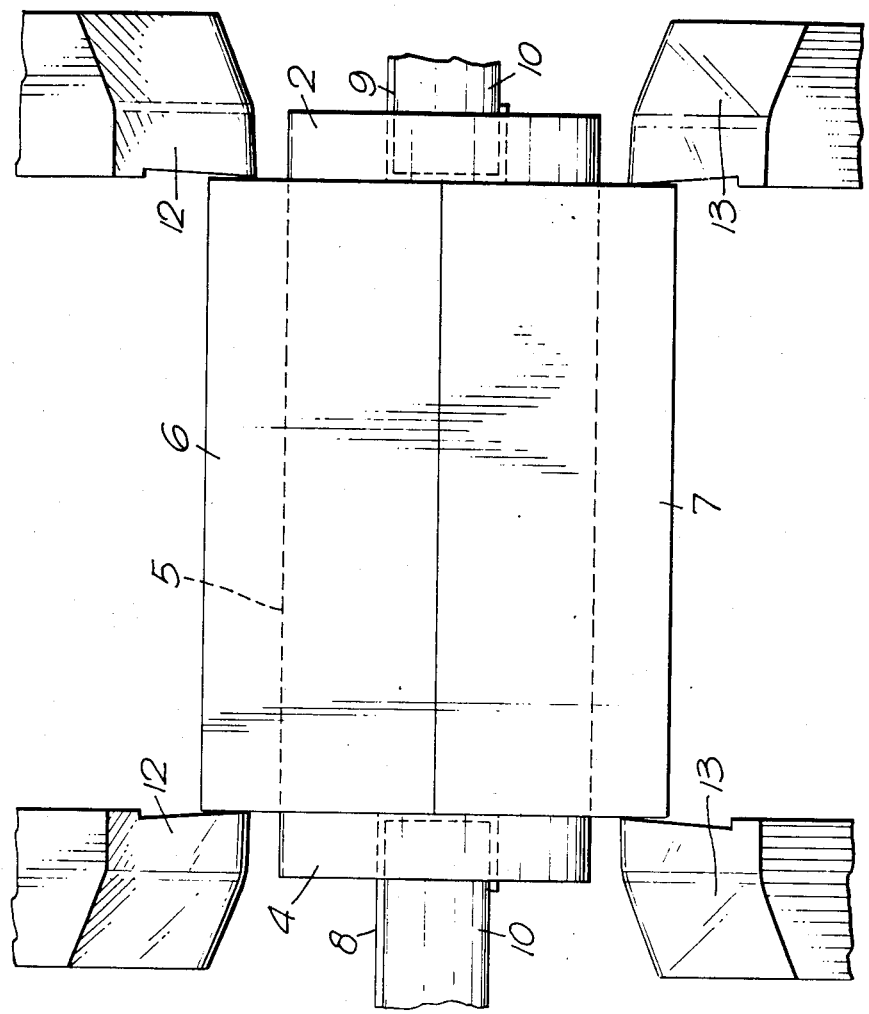
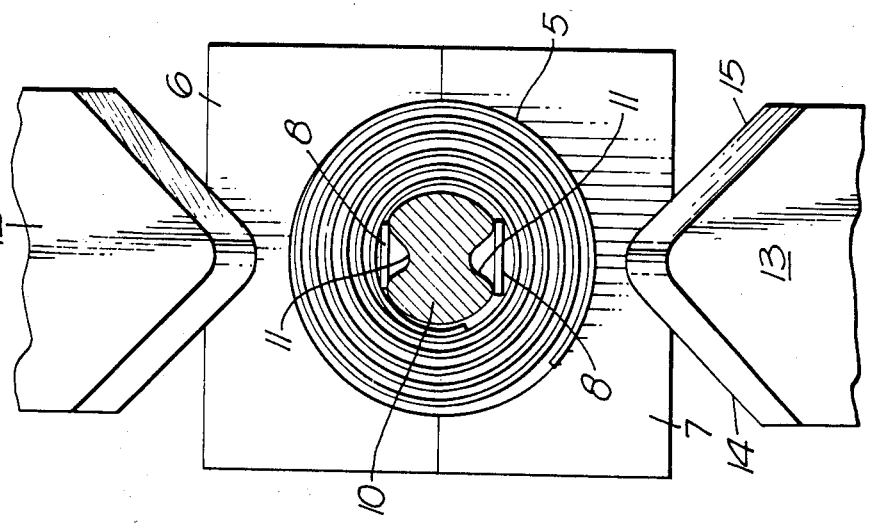

COLD-WELDING OF ELECTROLYTIC CAPACITOR ROLLS

This invention relates to the manufacture of aluminum electrolytic capacitors, and is primarily concerned with the connection of tabbing to the capacitor foils in such a way as to permit a relatively low inductance capacitor configuration.

According to the present invention there is provided a method of manufacturing aluminum electrolytic capacitors including the step of securing a piece of tabbing to a plurality of layers of anode or cathode foil in a single cold-welding operation using radiussed weld tooling of complementary curvature which distorts the aluminum sufficiently to provide adhesion and electrical connection between the layers.

In a conventional wound aluminum electrolytic capacitor, tabbing is staked to each foil at intervals along its length in order to provide multiple points of electrical connection rather than a single one so as to reduce capacitor inductance. Such a process is relatively difficult and costly to automate.

We have found that if an aluminum electrolytic capacitor is wound with the turns of its anode foil protruding from one end, and those of its cathode foil protruding from the other, then it can be possible to use conventional flat-faced cold-weld tooling to form a weld between several layers of one of the foils and a piece of tabbing. However, relatively high pressures are required, the maximum number of foil layers which can be welded in a single operation is generally limited to about ten, and the weld requires the extent of the protrusion of the foils to be relatively long to provide acceptable weld reliability.

However, we have also found that less pressure is required, and more foil layers can be simultaneously welded in a single operation when using weld tooling which has radiussed ends of complementary curvature. Moreover a shorter length of protrusion is required for the weld, with consequent saving in foil cost.

Particularly in the case of the simultaneous welding of say 25 or more foil layers a further reduction in the length of protruding foil required for welding can be obtained by designing the tooling so that the outer foil layers are each cut along a line substantially parallel with the protruding edge by the side of the tooling remote from that edge.

Figure 5:
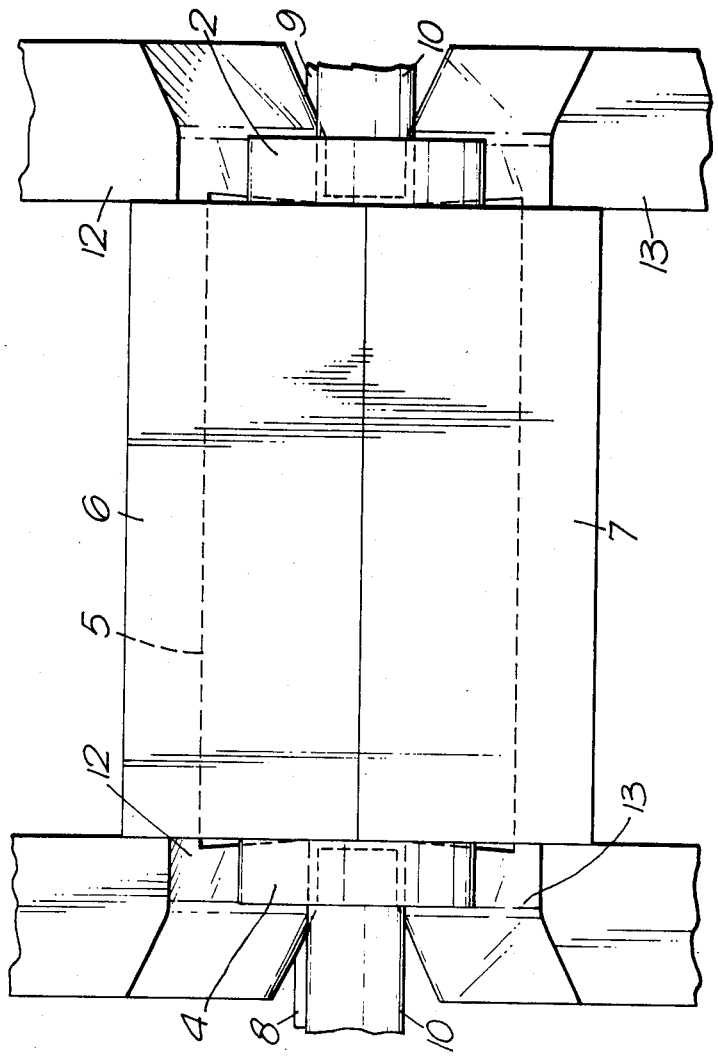
Figure 4:
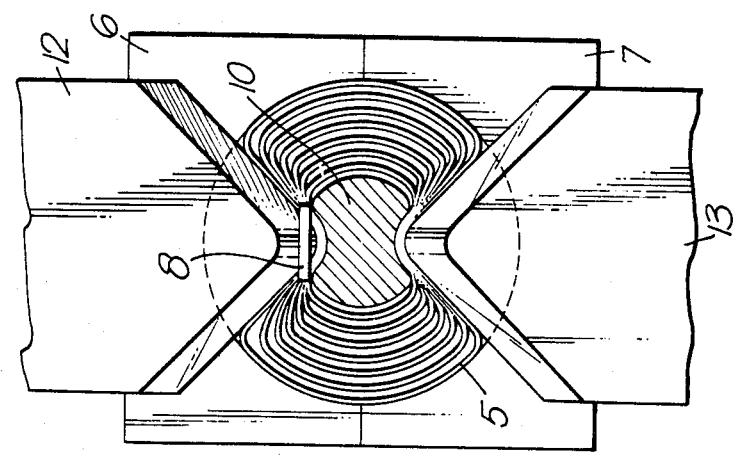
Figure 6:
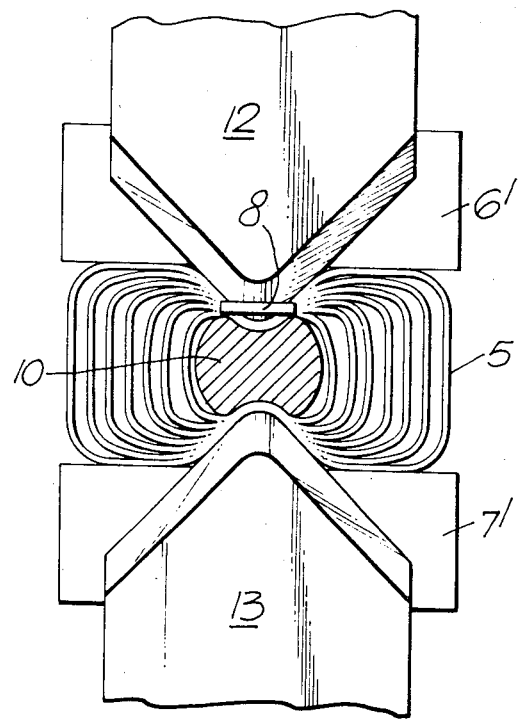

There follows a description of the manufacture of aluminum electrolytic capacitors by processes employing illustrative examples of the method of the invention. The description refers to the accompanying drawings in which:

FIG. 1 depicts a capacitor roll,

FIGS. 2 and 3 respectively depict end and side views of the capacitor roll positioned in welding tooling prior to welding, FIGS. 4 and 5 depict the corresponding views after welding, FIG. 6 depicts the end view after welding when using an alternative form of capacitor restraining block in order to provide a capacitor roll with a flattened profile.

Figure 7:
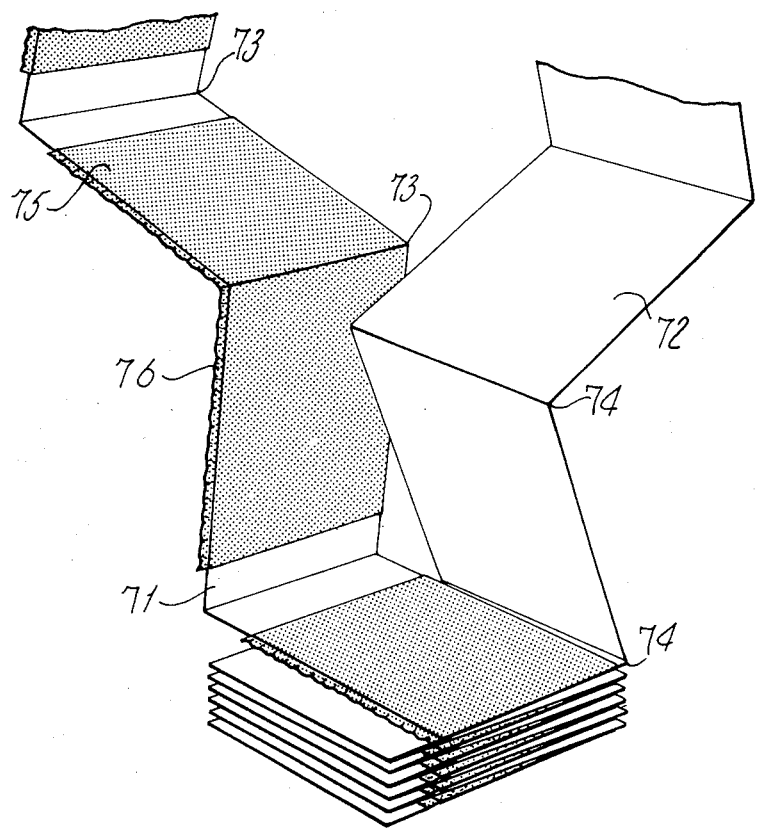
Figure 8:
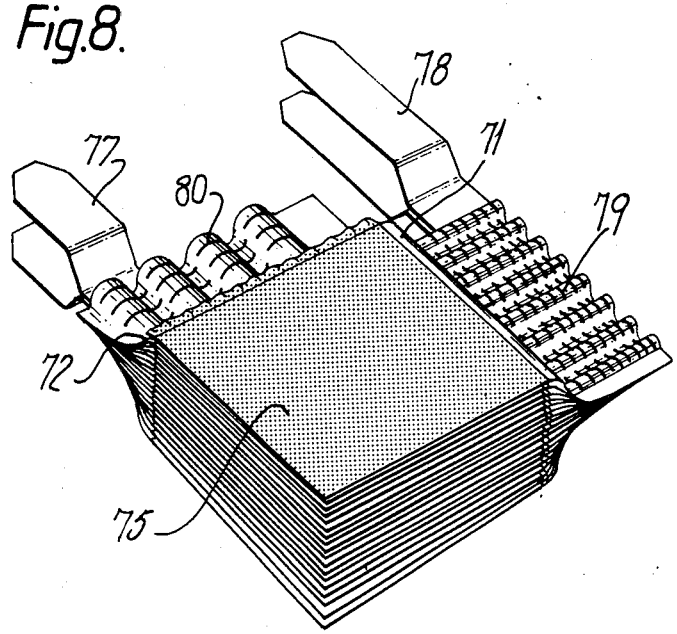
Figure 9:
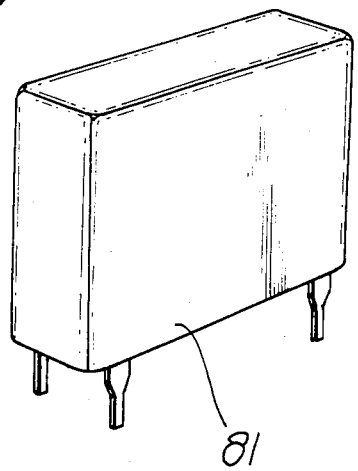

FIG. 7 depicts the assembly of the anode and cathode foils of an alternative form of capacitor, FIG. 8 depicts the capacitor of FIG. 7 after the attachment of tabbing to its foils, and FIG. 9 depicts the completed capacitor.

Referring to FIG. 1, a sandwich is made of a strip of paper 1, a cathode foil 2, a further strip of paper 3, and an anode foil 4. In this sandwich one side edge of the cathode foil extends beyond the corresponding side edges of the paper strips 1 and 3, whereas the other edge does not. The anode foil is similarly arranged, except that the anode and cathode foils protrude from opposite side edges. The sandwich is rolled up on a mandrel (not shown) and taped. The mandrel is removed, and the roll 5 is placed between a pair of restraining blocks 6 and 7 (FIGS. 2, 3) which are contoured to fit the roll so as to retain its shape while the foils are welded to two pieces of tabbing 8 and 9. The restraining blocks are shorter than the full width of the roll so as to leave exposed the two ends where the foils 2 and 4 protrude beyond the paper strips 1 and 3. The two pieces of tabbing 8 and 9 are placed around the ends of a pair of spindles 10 into the opposite ends of the roll in position formerly occupied by the mandrel. These spindles are generally cylindrical in shape, but each has a pair of diametrically opposed grooves 11 extending longitudinally. Upper and lower welding bits 12 and 13 are then forced together to trap the layers of foil and the tabbing between them and the spindles 10 (FIGS. 4 and 5). Each welding bit has a rounded nose having a radius of curvature to match that of the groove of its associated spindle having regard to the thickness of material that is to be welded. In this context different radii of curvature may be employed to weld the cathode foil 2 layers to tabbing 9 from those employed the anode foil 4 to tabbing 8 on account of difference in thickness of the two foils. The inwardly facing sides of the welding bits are provided with chisel edges to cut the outer layers of foil and so enable the weld to be made nearer to the ends of the roll. This in turn means that the anode and cathode foils do not have to protrude so far beyond the side edges of the paper strips, and hence a saving of foil can be made. Typically the weld tool is positioned so that the chisel edge is between 2 and 3 mm in from the edge of the foil.

From FIG. 4 it is seen that one effect of making the weld is to separate the edges of the foil layers in regions remote from the weld, and thus the impregnation of the paper strips with electrolyte is facilitated.

A pair of plane-faced restraining blocks 6' and 7' (FIG. 6) may be used in place of the restraining blocks 6 and 7 of FIGS. 2 to 5 in order to produce a flattened roll with a geometry better suited to fitting inside a can of generally cuboid shape.

By way of specific example a quarter inch diameter mandrel was used to make one inch length capacitor rolls from foils having lengths in the range 22 to 26". A typical example had sixteen turns. The foils of these capacitors were welded to their pieces of tabbing using quarter inch diameter spindles in which a pair of diametrically opposed longitudinally extending grooves with a radius of curvature of 0.03" had been milled to a depth of 0.137" from the quarter inch diameter cylindrical surface. The nose of each of the co-operating welding bits had a radius of curvature of 0.125" connecting planar side walls 14, 15 (FIG. 2) angled at right angles to each other. In forming the welds the nose of each welding bit was advanced into the co-operating groove of the spindle until the separation was reduced to 0.012", i.e. the difference between the radius of curvature of the groove and that of the nose of the welding tool, and in this way each layer of both foils was bent in the welding process through approximately a right angle on substantially constant radius.

When using the same general geometry of spindle and welding bits for welding tabbing to one inch roll length capacitors made from 33" long foils wound on a 5/16" mandrel, the comparable dimensions were 5/16" diameter spindle with groove radius of 0.185" to a depth of 0.04", welding bit nose radius of 0.16", and a finished weld thickness of 0.015". Similar figures for welding tabbing to half inch roll length capacitors made from 20 to 21" long foils wound on a 0.135" mandrel were a 0.135" spindle with a groove radius of 0.08" to a depth of 0.25", welding bit nose radius of 0.68", and a finished weld thickness of 0.012".

In each of these three instances the number of foil layers being welded was not sufficent to make it necessary to use differently radiussed tooling for welding the anode foil layers from that used to weld the cathode foil layers.

Although the foregoing specific description has related to welds in which the bending is over a single curve only, it is to be understood that the invention is applicable also to welds in which the bending is over two or more curves. Thus in the capacitor construction of FIGS. 7, 8 and 9 each piece of tabbing is secured by a weld of several corrugations.

Referring now particularly to FIG. 7, a cathode foil 71 and an anode 72 are each folded in fan-fold fashion at regular intervals along their length. The interval between consecutive folds 73 on the cathode foil is somewhat greater than the width of the anode foil, and similarly that between consecutive folds 74 on the anode foil is somewhat greater than the width of the cathode foil. Lengths of paper 75 are placed at intervals around one of the foils, typically the cathode foil, to act as separator material for absorbing the capacitor electrolyte and for preventing direct electrical contact between the two foils. The paper is conveniently secured in position by folding it in half around the foil and crimping the opposed paper edges 76 together. Each piece of paper is centred on a fold of one of the foils and extends in both directions from that fold for a distance just greater than the width of the other foil. Then the two foils are interleaved orthogonally, so that portions of the foil not encased in paper protrude from only one side of the resulting stack, while the bare portions of the paper encased foil protrude from an adjacent side. These protruding portions are then welded respectively to anode and cathode tabbing 77 and 78 (FIG. 8).

Fifty thicknesses of foil are welded to a piece of tabbing using tooling designed to produce a corrugated weld of symmetrical profile and uniform thickness. For this purpose the troughs between adjacent teeth of the tooling need to be slightly narrower than the teeth themselves in order to accommodate two weld thicknesses. Tooling used for welding the cathode provides corrugations 79 with a pitch of 0.135", a depth of 0.045", and a welded material thickness of 0.017". Different tooling is used for welding the anode foil to take account of the greater thickness, and in this instance the tooling produces corrugations 80 with a pitch of 0.243", a depth of 0.100" and a welded material thickness of 0.056".

The further processing of the capacitor may proceed along entirely conventionally, with the capacitor being sealed within an aluminum can of generally cylindrical shape. Since the capacitor itself is of generally cuboid shape this is somewhat wasteful of space, but, in comparison with an alternative option of sealing the capacitor within an aluminum can of generally cuboid shape, simplifies the sealing operation involved in spinning the skirt of the can around a base member. A preferred option is to use a plastics can 81 (FIG. 9) of generally cuboid shape in which case the skirt of the can is sealed to a gasket in the base of the can by heat welding.

We claim:

1. A method of manufacturing an aluminum electrolytic capacitor roll including the step of securing a piece of tabbing to a plurality of layers of anode or cathode aluminum foil in a single cold-welding operation using radiussed weld tooling of complementary curvature which distorts the aluminum sufficiently to provide adhesion and electrical connection between the layers, wherein the weld tooling is provided with a cutting edge which is employed to cut at least the outer layers of the foil along a line substantially perpendicular to the roll axis and wherein the layers of anode or cathode foil are formed by forming a roll of anode and cathode foils together with separator material, with the anode foil protruding from one end of the roll and the cathode foil protruding from the other, and wherein the weld tooling is configured to produce welds that are convex with respect to the roll axis.

2. A method as claimed in claim 1 wherein each foil layer of a weld includes a portion over which it is formed by cold-welding into a curve of constant radius subtending approximately a right angle at the center of curvature of said curve.

3. A method as claimed in claim 1, wherein 10 or more foil layers are welded to a piece of tabbing in said single cold welding operation.

4. A method as claimed in claim 1, wherein the layers are formed by forming a roll of anode and cathode foils together with separator material, with the anode foil protruding from one end of the roll and the cathode foil protruding from the other, and wherein the welding of the pieces of tabbing to the anode and cathode foils is accompanied by a partial flattening of the capacitor roll.

* * * * *